United States Patent [19]

Stucky

[11] 3,767,268

[45] Oct. 23, 1973

[54] AIR CONVEYOR FOR FOWL

[76] Inventor: James L. Stucky, P.O. Box 687, McPherson, Kans. 67560

[22] Filed: Dec. 13, 1971

[21] Appl. No.: 207,343

[52] U.S. Cl. .................................. 302/40, 302/59
[51] Int. Cl. ........................................... B65g 53/40
[58] Field of Search .................. 302/57, 59, 51, 52, 302/40; 222/490

[56] References Cited
UNITED STATES PATENTS

| | | | |
|---|---|---|---|
| 2,890,081 | 6/1959 | Terrett | 302/59 |
| 1,341,010 | 5/1920 | Cartwright | 302/51 X |
| 2,957,503 | 10/1960 | Sifter | 222/490 X |

FOREIGN PATENTS OR APPLICATIONS 701,271  12/1953  Great Britain .................... 302/57

Primary Examiner—Richard E. Aegerter
Assistant Examiner—Hadd S. Lane
Attorney—Harvey B. Jacobson et al.

[57] ABSTRACT

A device for conveying fowl from one point to another includes a conveyor chamber through which air under pressure is forced, a fowl inlet to the chamber having a conduit section extending longitudinally downstream and terminating within the chamber and conduit means exiting from the chamber and having an upstream end positioned closely adjacent but longitudinally spaced apart from the termination of the conduit section of the fowl inlet. A flow separator disposed within the chamber upstream of the termination causes the air to accelerate in flowing thereabout and to thereby create an area of reduced static pressure at the termination of the conduit portion.

7 Claims, 4 Drawing Figures

Patented Oct. 23, 1973
3,767,268
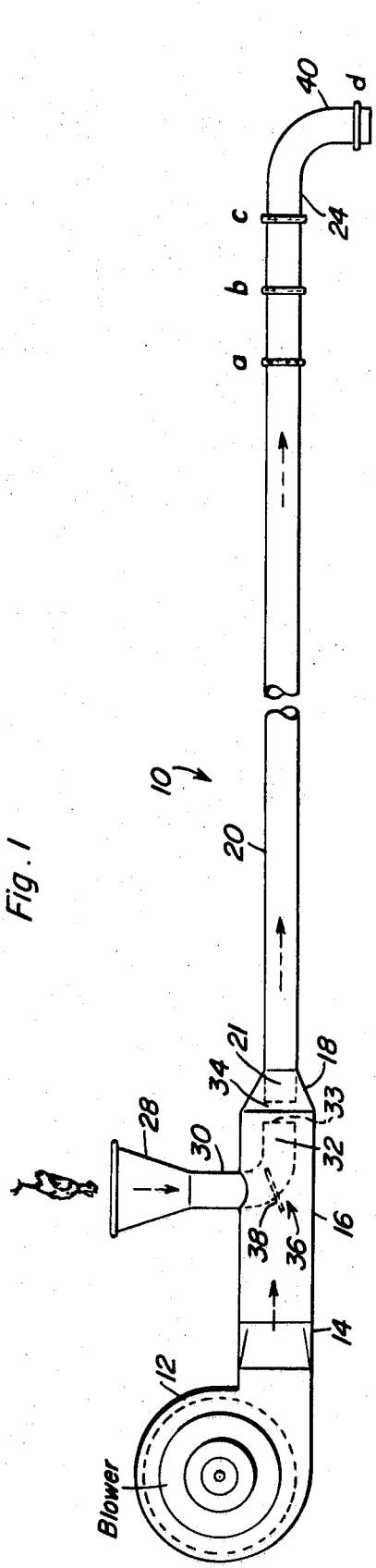
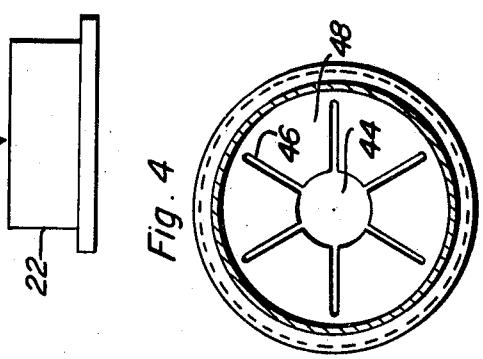
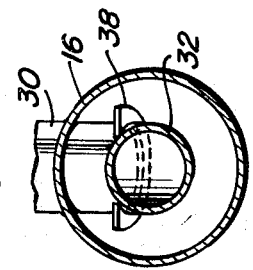
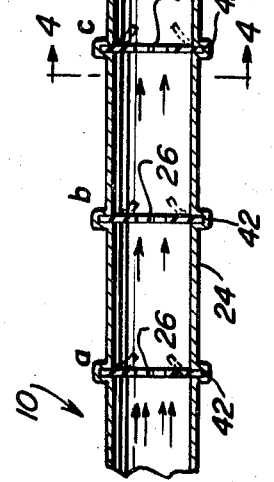
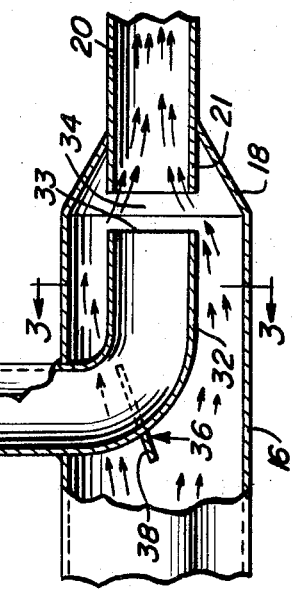

AIR CONVEYOR FOR FOWL

The present invention relates to apparatus for conveying fowl and, more particularly, to apparatus which utilizes air under pressure to move live or processed fowl from one point to another.

It is an object of the present invention to provide an apparatus which can safely transport live or processed fowl from one location to another without damaging the fowl.

It is another object of the invention to provide an apparatus for conveying fowl via a moving stream of air.

It is still another object of the present invention to provide an inlet for introducing fowl into a moving stream of air which utilizes static pressure differentials to prevent airstream leakage through the inlet.

Other objects and advantages will become apparent from the following description and appended claims.

Briefly stated, in accordance with the aforesaid objects, the present invention provides a fowl conveying device comprising a conveyor chamber having an upstream opening at one end and a downstream opening at the other end, air supply means communicating with said upstream opening for supplying air under pressure thereto, inlet means communicating with said chamber intermediate said openings for introducing fowl therethrough, said inlet means including a downstream extending conduit section having a termination within said chamber, conduit means communicating with said discharge opening for receiving the fowl from said inlet means and conveying it to its destination, the upstream end of said conduit means positioned closely adjacent but longitudinally spaced apart from the termination of said conduit section, and flow separator means in said chamber upstream of said termination, whereby air under pressure entering said chamber is caused to diverge around said separator means and to converge downstream of said termination.

The invention will be better understood from the following description taken in conjuction with the accompanying drawings.

FIG. 1 is a side elevation view of the fowl conveying apparatus of the present invention showing live fowl entering and leaving the apparatus.

FIG. 2 is a fragmentary perspective view, partially in section, of the apparatus of FIG. 1.

FIG. 3 is a sectional view taken substantially along line 3—3 in FIG. 2.

FIG. 4 is a sectional view taken substantially along line 4—4 in FIG. 2.

Referring now to the drawings, there is shown generally at 10 the fowl conveying device of the present invention. Device 10 consists of a blower fan 12 which supplies air under pressure to upstream end 14 of conveyor chamber 16. The air passes through chamber 16 and exits through downstream end 18 thereof. Conduit 20, joins chamber 16 at downstream end 18 thereof, and has its upstream end 21 extending into chamber 16. Conduit 20 traverses the distance between chamber 16 and the destination of the fowl, shown here for convenience as container 22. The discharge end 24 of conduit 20 houses one or more spaced apart baffles 26 to retard the passage of the fowl and slow its rate of movement prior to its leaving the conduit.

Chamber 16 is generally cylindrical, having a circular cross section along substantially its entire length, and preferably tapering at downstream portion 18 to the diameter of conduit 20. Fowl inlet nozzle 28, which is preferably a truncated cone, introduces fowl through generally L-shaped conduit 30 to chamber 16. Conduit 30 joins chamber 16 at a point intermediate its ends and has a section 32 extending longitudinally downstream within, and generally concentric with, chamber 16. Section 32 terminates at 33 within chamber 16. The upstream end 21 of conduit 20 is positioned closely adjacent but longitudinally spaced apart from termination 33 of section 32 to define a space 34 therebetween. Flow separator means 36 consists of a generally circumferential fin 38 disposed about a portion of the periphery of conduit 30 and extending therefrom into chamber 16. Fin 38 forms a downstream opening acute angle with the longitudinal axis of chamber 16 and is diposed circumferentially at least about the upstream facing portion of the periphery of conduit 30, but preferably also along the sides of conduit 30.

Baffles 26 are positioned within discharge end 24 of conduit 20 as shown in FIG. 1, and preferably comprise a series of closely spaced apart baffles $a$, $b$, $c$ and a terminal baffle $d$ immediately adjacent the downward projecting outlet 40 of discharge end 24. Circumferential recesses 42 formed in the inner peripheral wall of conduit 20 are adapted to closely receive the outer peripheral edge or base of baffle 26 therein. The baffles may be held in place along their peripheral edge or base within recess 42 in any suitable manner, such as by use of an appropriate adhesive. As can most clearly be seen in FIG. 4, each baffle 26 is a resilient disc, preferably made of comparatively thick rubber, having a central aperture 44 therein and divided by radially extending slots 46 into a plurality of flaps 48. The flaps are adapted to be deflected in a generally downstream arc by the fowl as it passes through the baffle.

The operation of fowl conveying device 10 will become readily apparent from the following description. Blower fan 12 forces air under pressure into upstream end 14 of chamber 16, out downstream end 18 and into conduit 20. As the air stream passes across flow separator 36 it is forced to diverge therearound, thereby increasing in velocity and finally converging downstream of termination 33. The velocity variations in the flow pattern create a decreased static pressure at 34 relative to ambient pressure at the inlet to nozzle 28 and the pressure differential which results prevents the air under pressure in chamber 16 from backing up through conduit 30 and nozzle 28. The fowl is placed or dropped into nozzle 28 and proceeds through L-shaped conduit 30 into conduit means 20. Space 34 is small compared with the size of the fowl and does not disrupt its smooth passage from section 32 of L-shaped conduit 30 into upstream end 21 of conduit 20. The fowl is carried gently through conduit 20 by the air flow therein. Just prior to reaching its destination, where it is dropped through outlet 40, the fowl is caused to pass through discharge end 24 of conduit 20 and through baffles 26 therein. As the fowl passes through a baffle 26, the flaps 48 slow its movement and, at the same time, deflect in a generally downstream arc to open a passageway through which the fowl can proceed.

While the present invention has been described with reference to particular embodiments thereof, it will be understood that numerous modifications can be made by those skilled in the art without actually departing from the scope of the invention. Accordingly all suitable modifications and equivalents may be resorted to which fall within the scope of the invention as claimed.

What is claimed as new is as follows:
1. A fowl conveying device comprising:
a conveyor chamber having an upstream opening at one end and a downstream opening at the other end;
air supply means communicating with said upstream opening for supplying air under pressure thereto;
inlet means communicating with said chamber intermediate said openings for introducing fowl therethrough, said inlet means comprising a truncated conical inlet portion joined to an L-shaped conduit portion, the horizontal element of said L-shaped portion extending downstream and having a termination within said chamber;
conduit means communicating with said discharge opening for receiving the fowl from said inlet means and conveying it to its destination, the upstream end of said conduit means positioned closely adjacent but longitudinally spaced apart from the termination of siad element and coaxial therewith;
flow separator means in said chamber upstream of said termination, whereby air under pressure entering said chamber is caused to diverge around said separator means and to converge downstream of said termination, said flow separator means comprising a fin circumferentially disposed about and extending into said chamber from at least the upstream facing portion of the periphery of said conduit portion, said fin forming a downstream opening acute angle with the longitudinal axis of said chamber; and
baffles laterally disposed at a plurality of points within said conduit means to slow the rate of fowl movement therethrough.

2. A fowl conveying device, as claimed in claim 1, wherein said chamber and the horizontal element of said L-shaped portion are circular in cross section.

3. A fowl conveying device, as claimed in claim 1, wherein said element and the upstream end of said conduit means are coaxial with said chamber.

4. A fowl conveying device, as claimed in claim 1, wherein each of said beffles comprising a resilient disc having a central aperture therin and a plurality of slots extending radially from said aperture defining a plurality of flaps therebetween, whereby said flaps are adapted to deflect in a generally downstream arc out of contact with the fowl as the fowl pass through said baffle.

5. A fowl conveying device, as claimed in claim 1, wherein said element is concentric with said chamber about the longitudinal axis thereof.

6. A fowl conveying device, as claimed in claim 1, wherein said fin forms a downstream opening acute angle with the longitudinal axis of said chamber.

7. A fowl conveying device, as claimed in claim 5, wherein said fin extends circumferentially about and extends into said chamber from the sides and upstream facing portion of the periphery of said L-shaped conduit portion.

* * * * *